March 17, 1936.    E. H. HAUSSER    2,034,258
LOCKING WASHER
Filed May 2, 1934
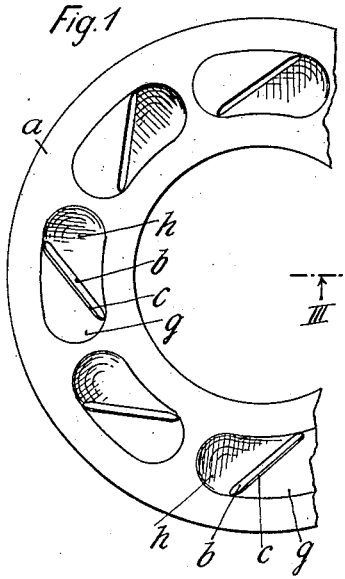
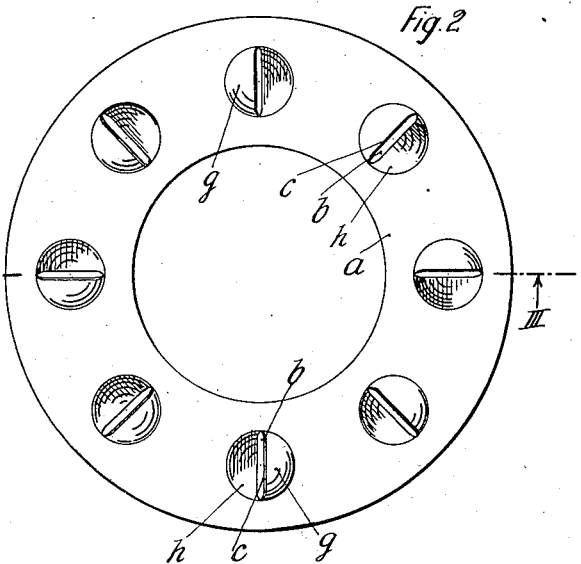
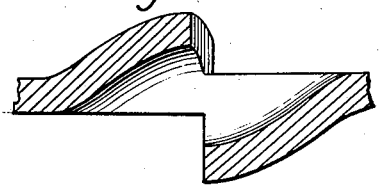
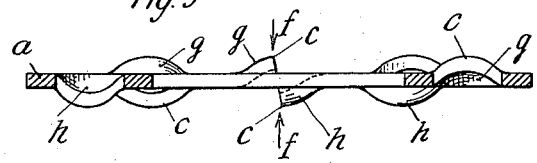
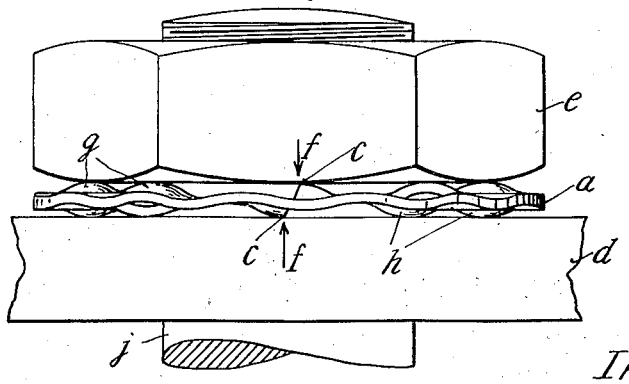
Inventor:
Ernst Hermann Haüsser
by Karl Michaelis
Atty.

Patented Mar. 17, 1936

2,034,258

UNITED STATES PATENT OFFICE 2,034,258

LOCKING WASHER

Ernst Hermann Hausser, Stuttgart, Germany

Application May 2, 1934, Serial No. 723,498
In Germany May 20, 1933

1 Claim. (Cl. 151—35)

My invention relates to a nut-locking device of the kind in which the locking element is formed by a washer provided with suitably bent indentations forming teeth which engage the material of the members to be locked when the nut is screwed down.

In one type of washer of this kind as heretofore known the indentations are either formed in the edges of the washer, their rim portions being bent correspondingly, the teeth formed in this manner being unilaterally resilient and their edges exerting different resistances in different places so that they cut into the material of the members to be locked to different depths. Other washers of a similar kind are formed with tongues, struck up from the body portion between the inner and outer edges of the washer, which are likely to spring back and be thus rendered inefficient for the purpose in view.

It is an object of my invention to avoid these drawbacks and to provide an improved washer in which the edges of the locking teeth are brought to uniform engagement along their entire length and are uniformly supported, their teeth being substantially rigid and not deformable.

To this end I form the washer with slits which do not however intersect the edges of the washer, and I raise the metal adjoining each slit on either side to make it project on opposite sides of the washer in the form of a pair of hollow teeth facing each other, which are arched similarly to the nails of a finger and present curved biting edges. Nevertheless, the resiliency of the washer required for the locking action is not diminished and the locking effect is not impaired if the length of the locked members, for instance screw bolts or the like, is increased, for the necessary resiliency is obtained by the washer itself, which, on the screwing down of the nut is bent to a wave-like shape. This is a further difference between the new washer and the known washers which remain plain and flat when the nut is screwed down.

In the drawing affixed to this specification and forming part thereof some embodiments of my invention are illustrated diagrammatically by way of example.

In the drawing

Figs. 1 and 2 are plan views of portions of washers according to my invention, illustrating different arrangements of the indentations.

Fig. 3 is a vertical section of the washer along the line III—III shown in Fig. 2.

Fig. 4 is a side elevation of two members screwed together and locked by means of the washer shown in Figs. 2 and 3.

Fig. 5 is a partial section, drawn to an enlarged scale, of a washer on a circular line crossing the middle of one of the slits.

In all figures similar parts are marked with the same reference numerals.

In the drawing $a$ is an annular washer made of steel or the like and formed with slits $b$ which do not intersect the inner or outer edges of the washer. The slits may extend at an angle to the diameters of the washer as shown in Fig. 1. If desired, however, they may be arranged radially as shown in Fig. 2. The portions adjacent each slit are forced by bending or embossing to opposite sides of the washer, as shown in Fig. 3, thus forming hollow shovel-like projections $g$ and $h$ protruding to alternate sides of the washer. Each projection forms a substantially rigid tooth, comprising a sharp biting edge $c$ which in operative position is forced into the material of the members to be locked, as will be seen from Fig. 4, in which $d$ is a part of a machine or the like, while $j$ is a screw bolt extending through a hole provided in the member $d$ and carrying a nut $e$, the washer $a$ being inserted between member $d$ and nut $e$.

In operation, when the nut is screwed down, pressure is exerted on the edges $c$ in the direction of the arrows $f$ shown in Figs. 3 and 4, which forces the edges into the material of the member $d$ and the nut $e$. Besides this the washer $a$ is imparted by this pressure a wave-like shape as indicated in Fig. 4 on an exaggerated scale. Since the washer consists of elastic material, for instance steel, it presses the edges $c$ against the engaging surfaces of the member $d$ and nut $e$ even if the screw bolt $j$ is lengthened, and the distance between member $d$ and nut $e$ increased. In consequence thereof the edges $c$ still engage the indentations formed by them in member $d$ and nut $e$ when the nut is screwed down, so that they perform their locking action continually.

Since the slits $b$ do not intersect the edges of the washer, the teeth are far less liable to be deformed than the teeth of the known washers which extend to the edges thereof. If desired, however, slits intersecting one of the edges of the washer and having their own edges suitably bent may be provided in addition.

As a rule, it will be sufficient to provide a small number of slits and projections such as shown in Figs. 1 to 3, the length of these indentations being relatively short. Tests have shown that a sufficient locking action is obtained in this manner, since the edges of the teeth are forced into the material of the members to be locked uniformly along their entire length and with uniform and correspondingly great force, acting along a relatively long path, so that the teeth do not become disengaged from their counter members, even if the distance between them is somewhat increased. It will be seen that the lock washers in accordance with my invention are provided with a plurality of slits which extend between but do not intersect the inner and outer peripheral edges of the washer, the metal bordering said slits having expanded portions rising on opposite sides of the washer in the form of hollow teeth facing each other which are arched to present substantially point biting contact with opposed surfaces.

The locking washer according to my invention may be used not only in connection with nuts, but in any case in which two members shall be locked against rotation or parallel translation with respect to each other. It may be adapted to the shape of the members to be locked, for instance by shaping it as a cone or the like, instead of a flat annulus. Owing to the shovel-like shape of the teeth any cuttings detached by the biting edges from the metal on which they act, are hidden in these teeth and are thereby prevented from dropping out and giving rise to disturbances. This is particularly important if the locking washers are used in connection with electrical apparatus or machinery.

I wish it to be understood that I do not desire to be limited to the exact details of construction shown and described, for obvious modifications will occur to a person skilled in the art.

I claim:—

An annular locking washer for nuts and bolts, said washer being formed with a plurality of slits which extend between, but do not intersect the inner and outer peripheral edges of the washer, the metal bordering said slits having expanded portions rising on opposite sides of the washer in the form of hollow teeth facing each other which are arched to present substantially point biting contact with opposed surfaces.

ERNST HERMANN HAUSSER.